Jan. 21, 1969     F. J. TERWOERDS ET AL     3,422,982
BREATHER FOR A GEAR HOUSING
Filed April 17, 1967

INVENTORS
FRANCIS J. TERWOERDS
GERALD L. MYERS
BY
ATTORNEYS

United States Patent Office 3,422,982
Patented Jan. 21, 1969

3,422,982
BREATHER FOR A GEAR HOUSING
Francis John TerWoerds and Gerald Lee Myers, Toledo, Ohio, assignors to Dana Corporation, Toledo, Ohio, a corporation of Virginia
Filed Apr. 17, 1967, Ser. No. 631,498
U.S. Cl. 220—44                   2 Claims
Int. Cl. B65d 51/16

ABSTRACT OF THE DISCLOSURE

A breathing apparatus for a gear housing serving to expel air from the housing and having a first portion thereof inside of the housing and a second portion outside of the housing; the portions having a continuous bore extending therethrough. This breathing apparatus has a number of spaced apertures leading from the bore of the first portion to the periphery thereof; these apertures allowing air to flow into the bore therethrough to break oil films tending to climb upward through the bore. The bore also has a plurality of apertured plates disposed vertically above the apertures in the first portion which function as a secondary means to break up oil bubbles tending to move up through the bore with escaping air.

Specification

Figure 1:
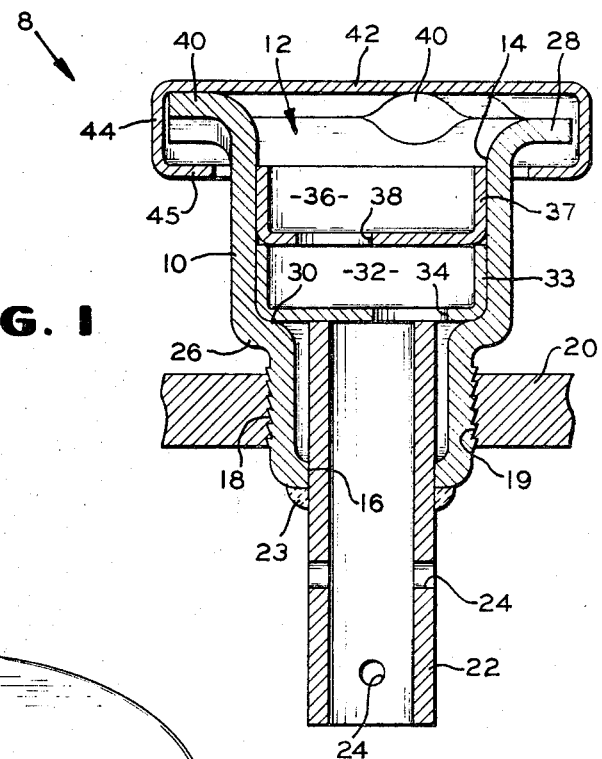

This invention relates to a breather apparatus for a housing. More particularly, the invention set forth herein relates to an improved gear housing breathing apparatus which is especially adapted to fully and effectively preclude the escape of oil from the interior of a gear housing in performing its breathing function.

The exact functional design of any breather apparatus is important in those gear housings in which minimum lubrication levels are a critical prerequisite to proper lubrication, as oil losses through a breather or as a result of an inoperative breather can be a burdensome problem.

Generally, in a housing containing such rotatable elements, a significant quantity of heat is generated within the housing upon operation of these elements. This increase in the internal heat, in turn, causes a proportional increase in the air pressure within the housing. Furthermore, movement of the rotatable elements within the gear housing causes the lubricant to splatter about in the housing. This splattering tends to disturb uniform lubrication patterns in the housing and also causes the lubricant to foam into bubbles. Some lubrication particles in the form of such bubbles will be projected to the inner periphery of the housing and the increased air pressure in the housing will often attempt to push some lubrication bubbles out of the housing through air breather assemblies. Those oil bubbles which escape to the outside of the housing create a fire hazard problem. In addition, these air breather assemblies will frequently become clogged by a collection of oil bubbles, and as a consequence, the breathing function is accordingly hampered.

In order to overcome this oil loss and breather clogging problem, various types of breathing devices have been used for gear housings in the prior art, however, none of these devices have been fully successful in preventing the escape of lubricating oil from a gear or other similar housing. Some of these prior art devices have utilized systems to aid in the breaking of oil bubbles and oil films before they reach the outermost extremity of a vent in the particular breathing device. These systems have generally been limited to various structural means utilized to direct oil droplets collected in the breather back into the gear housing.

One particular type of prior art breather device, as seen in United States Patent 2,880,744, makes use of a vent tubular member reaching into a transmission or gear housing, which tubular member is covered at its outermost end by a loosely secured cap, with a baffle structural arrangement inside the vent tube. This baffle attempts to break any oil films and oil bubbles rising in the vent tubular member with air that is escaping. The air which has passed through the baffles passes out of the tubular member under and around flanged portions of the cap member. This type of device has only limited effectiveness as oil bubbles and oil films frequently manage to remain with escaping air through even the most complex baffle arrangements.

Other types of breathers for gear housings, as exemplified by United States Patent 2,329,078, also use a basic tubular vent arrangement, some relying solely on the effect of gravity to separate oil bubbles from escaping air, while several of this general category rely on complex structural arrangements for oil separation purposes. Those devices relying mainly on the gravitational effect for separation purposes are only partially effective in this respect. On the other hand, the more complex oil separating devices have higher manufacturing costs weighed against their relative effectiveness and are more expensive to maintain and manufacture.

In view of these problems, it is an object of this invention to provide an improved breather structure for a gear housing which will effectively prevent the escape of oil from the gear housing, and will at the same time allow the necessary breathing operation to function optimally.

Another object of this invention is to provide a breather for a gear housing which is relatively simple in construction and comprised of few parts so that any manufacturing cost involved is minimal.

Yet another object of this invention is to provide a breather assembly for a gear housing which is relatively simple to remove from the gear housing for inspection and maintenance purposes.

Figure 2:
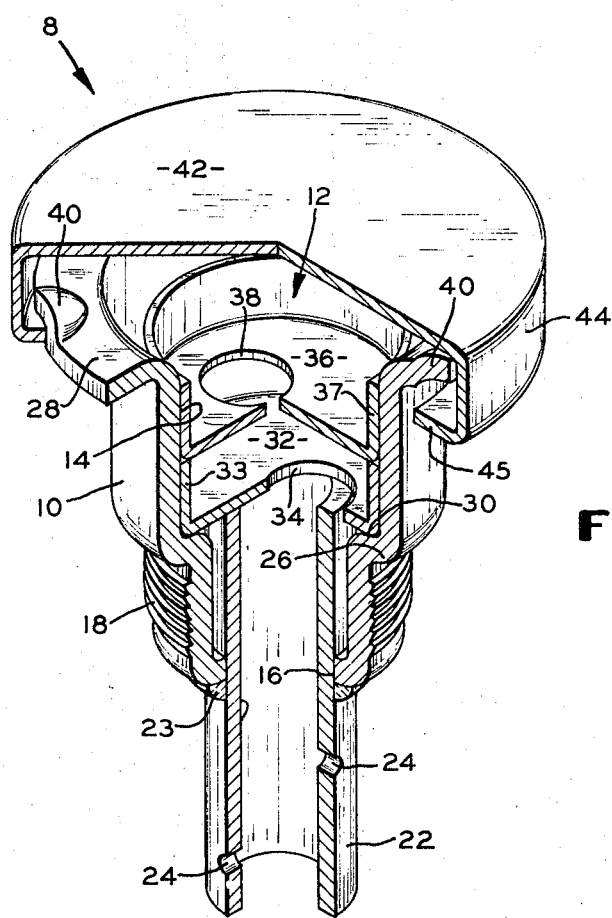

Other objects and advantages of the present invention will become more apparent from the following description taken in conjunction with the drawings, in which:

FIG. 1 is a cross-sectional view of one embodiment of a breather assembly incorporating this invention; and FIG. 2 is a perspective view partly in section of the embodiment of the breather assembly of FIG. 1.

In general, the subject invention resides in a breather apparatus for a gear housing, such as a transmission housing, which apparatus comprises a hollow cylindrical plug that is capable of being inserted into a section of a gear housing, a cylindrical perforated tube which is an extension of the plug and which extends into the interior of the gear housing, and a loosely fitting vent cover which sits over a shouldered portion on the outward end of the plug. The plug has a series of apertured baffle plates disposed in an axially extending bore therein. The perforated tube extension of the plug serves as a primary means and zone for separating any oil particles from the air escaping from the gear housing through the breather apparatus, while the arrangement of the baffle plates serves as secondary means for further separating any remaining oil bubbles which may perchance not be separated by the primary means.

Referring to the drawings in which a preferred embodiment of this invention is set forth, a breathing apparatus 8 is shown. The main portion of the breathing apparatus 8 is formed by a plug 10 of generally cylindrical shape but varying diameter. The plug 10 has a vertical axis and an interinor bore 12 serving as the air escape path, the shape of which bore generally follows the exterior contour of the plug. The bore 12 is disposed so as to be generally coaxial with the vertical axis of plug 10 and extends through the complete axial extent of the plug, and at each end of the plug there are openings 14 and 16 communicating the bore 12 with any outside areas. The opening 14 is at the upper end of plug 10, while opening 16 is at the lower end of the plug. These openings vary in width according to the diameter of the plug 10 at the particular end at which the opening is located.

A serrated portion 18 encircles the outer girth of plug 10 at an area just above opening 16, and this serrated portion is adapted to securedly sealingly engage the plug into a vertical position in an opening 19 in a housing shown fragmentarily at 20 which covers an arrangement of transmission gearing, not shown.

Inserted in the lower opening 16 of plug 10 is a cylindrical tube 22 having an inner and outer peripheral surface, and substantially one-half of the length of this tube extends into the bore 12 of the plug 10 so as to be substantially coaxial with the vertical axis of the plug. The tube 22 is appropriately secured to the plug 10 as by a weld 23 between the lower end of the plug and the tube. Throughout the peripheral area of that part of the tube 22 extending out of plug 10 there is a plurality of apertures 24 extending radially through the wall of the tube. In the preferred embodiment, there are four apertures 24 disposed in a paired and opposed relationship, with opposing holes located 180° apart and one pair of apertures being disposed 90° from the other pair and spaced axially with respect thereto. However, it is not essential for the purposes of this invention that these holes be spaced in any particular geometric relationship. The tube 22 has a uniform internal diameter, and the apertures 24 in the tube 22 are of a diameter which is smaller than the inner diameter of tube 22.

In the preferred embodiment shown in FIG. 1, plug 10 is formed by a stamping process, and tube 22 is manufactured as a separate element. However, the plug 10 may be formed integrally with the tube 22.

The plug 10 varies somewhat in diameter from one end to the other, and by this varying diametrical extent, shouldered portions are formed at two places along the length of the plug. In particular, that part of plug 10 just above and adjacent to threaded portion 18 is flared radially outwardly to a greater diametrical extent than the diameter of the threaded portion and, as a consequence, shoulder 26 is formed. When the plug 10 is inserted in housing 20, shoulder 26 will be seated just adjacent to the outer periphery of the transmission housing 20, since this shoulder is located just above and adjacent to threaded portion 18. The extreme upper end of cylindrical plug 10, adjacent to opening 14 therein, is also flared radially outwardly so as to form another shoulder area 28 on the plug. The shouldered area 28 has the largest diametrical extent of any portion of plug 10, and as a result, opening 14 is correspondingly larger than opening 16.

The bore 12 has an axially upward facing annular ledge 30 formed on the inner surface of the shoulder 26. Seated directly on this ledge is a circular plate 32 having a circumferentially disposed and upwardly projecting flange 33 and the diameter of the plate 32 and flange 33 are substantially equal to the diameter of the bore 12 in this immediate zone. Offset from the center of the plate 32 is located a circular aperture 34, which aperture serves as an air passage through the plate. On the upper end of the flange 33 there is seated another circular plate 36 which also has a circumferentially disposed and upwardly projecting flange 37. The plate 36 has a circular aperture 38 therein which serves as an air passage point through the plate, and this aperture is also offset from the center of plate 36. While the apertures 34 and 38 in plates 32 and 36 respectively are offset from the centers of the corresponding plates, it is preferable, in addition, that these apertures not be coaxial relative to one another. Thusly disposed, the plates 32 and 36 provide a labyrinth, baffle arrangement which serves to break the direct flow of air escaping upward through the bore 12 of the plug 10 and, consequently, these plates serve as secondary means for separating oil bubbles from the air. Furthermore, if an even greater baffle effect is desired, additional circular plates, similar to those described above, can be provided accordingly.

At the upper end of the plug 10 where the opening 14 is located, the flanged shoulder 28 has three circumferentially spaced and axially upwardly extending bosses 40 formed by raised indentations in the flanged shoulder 28 itself. A circular cap 42 with a circumferentially disposed flange 44 fits over shoulder 28, and the inner surface of this cap directly beneath the top thereof rests on the peaks of the three spaced bosses 40. The circumferential flange 44 extends around the circumferential periphery of cap 42 and is crimped to form a radially inwardly extending portion 45 which axially secures the cap 42 to the shoulder 28 of plug 10. The radially inwardly extending portion 45 of flange 44 extends substantially below and clear of shoulder 28, and the cap 42 is able to move a limited axial extent relative to this shoulder. Furthermore, the diameter of the annular flange 44 is slightly larger than the diametrical extent of shoulder 28 and, as a consequence, air escaping up through the bore 12 of the plug 10 will pass out around shoulder 28 and to the outside by way of the space between the radially inwardly extending section 45 of flange 44 and shoulder 28 of plug 10.

When the mechanical elements within the gear housing 20 are operating, the motion and resultant heat generated causes the lubricating oil therein to foam and generate oil bubbles and oil films. Furthermore, the moving parts within the gear casing cause oil droplets and bubbles to be splattered all around the inner walls of the gear casing. With the increased heat generated within the gear casing, the air pressure therein increases, and oil droplets and oil bubbles splattered on or near the opening of tube 22 of the breather assembly are pushed up the inner walls of the tube by the escaping air. As these oil bubbles are pushed up the tube 22 they cling to the inner surface by an adhesive action forming an oil film on this inner surface. When an oil film reaches one of the numerous apertures 24 in tube 22 a stream of air passing from inside the gear casing and through the apertures breaks the oil film causing it to condense and form into an oil droplet. This oil droplet then falls down through tube 22 and into the gear housing. This process is repeated continuously as long as air is attempting to escape from the housing as all apertures 24 operate concurrently to break oil films all around the inner surface of tube 22. The escaping air passing up through tube 22 then moves free of oil bubbles up through the bore 12 and out through the holes in baffle plates 32 and 36, and thence out under cap 42 to the atmosphere. Baffle plates 32 and 36 serve as a secondary means to separate any remaining oil from the escaping air.

What is claimed is:

1. A breathing apparatus for expelling air free of oil particles from a closed gear housing comprising in combination; (a) a substantially cylindrical plug with a vertical axis and with an upper and lower end, said lower end extending into the closed gear housing, and the upper end projecting out of the gear housing, (1) said plug having means for sealingly engaging the periphery thereof with said housing and having an axially disposed bore extending through the complete length of the plug for passage of air from the closed housing through the bore to areas outside the closed housing, (2) the bore in the lower end of said plug having a substantially uniform diameter, (3) the lower end of said plug having a plurality of apertures extending radially outwardly from the bore therein to the outer surface of the plug, with said apertures having diameters smaller than the bore diameter, (b) labyrinth means disposed in the bore and located vertically above said apertures for providing a baffle effect to air escaping up through the bore, (c) and a cap member including means loosely securing said member over the upper end of said plug.

2. A breathing apparatus according to claim 1 in which the lower end of said plug is formed separately from the upper end, said lower end being inserted in the bore of said upper end and fixed securely thereto, said lower end being tubular and having therein said radially disposed apertures extending from the inner surface of said lower end to the outer end thereof, said bore in the upper end of the plug having therein said labyrinth means.

References Cited
UNITED STATES PATENTS 2,931,336   4/1960   Hendel _____ 137—197
3,128,899   4/1964   Rano _____ 220—44

JAMES B. MARBERT, *Primary Examiner.*